United States Patent [19]

Arakawa

[11] Patent Number: 5,058,847
[45] Date of Patent: Oct. 22, 1991

[54] HANGING HOLDER AND HANGING STRUCTURE INCLUDING SAME

[75] Inventor: Hideo Arakawa, Tokyo, Japan

[73] Assignee: Arakawa & Co., Ltd., Japan

[21] Appl. No.: 540,579

[22] Filed: Jun. 19, 1990

[51] Int. Cl.⁵ .............................................. A47H 1/10
[52] U.S. Cl. ..................................... 248/328; 248/243
[58] Field of Search ............... 248/328, 317, 323, 327, 248/243, 235, 345; 211/113; 108/149

[56] References Cited

U.S. PATENT DOCUMENTS

| | | | |
|---|---|---|---|
| 2,174,747 | 10/1939 | Hueglin | 248/343 |
| 3,888,448 | 6/1975 | Rowland | 248/328 |
| 3,990,665 | 11/1976 | Joussemet | 248/317 X |
| 4,442,993 | 4/1984 | Tseng | 248/327 |
| 4,787,592 | 11/1988 | Aoshika | 248/327 |

FOREIGN PATENT DOCUMENTS

| | | |
|---|---|---|
| 1167605 | 4/1964 | Fed. Rep. of Germany. |
| 8520830 | 10/1985 | Fed. Rep. of Germany. |
| 1369566 | 7/1964 | France. |
| 2627241 | 8/1989 | France. |
| 1516783 | 7/1978 | United Kingdom. |

Primary Examiner—Ramon O. Ramirez
Attorney, Agent, or Firm—Steinberg & Raskin

[57] ABSTRACT

A hanging holder capable of being readily mounted or removed with respect to a wire at any desired time and without dismounting a hung structural assembly previously formed. The hanging holder includes a holder body, a slide lock sleeve, a bottom cover and a lock member which are formed with slits so as to vertically extend therethrough and laterally extend to their vertical through-holes, respectively, in such a manner that the slits of the holder body, slide lock sleeve and bottom cover are arranged so as to be aligned with one another and communicate with one another and the slit of the lock member is arranged so as not to be aligned with the slits of the holder body, slide lock sleeve and bottom cover when the lock member is threadedly fitted on the slide lock sleeve. The hanging holder also includes at least one support provided on the holder body for supporting an article to be hung therethrough on the holder body. Also, a hanging structure is provided which includes such a hanging holder.

30 Claims, 11 Drawing Sheets

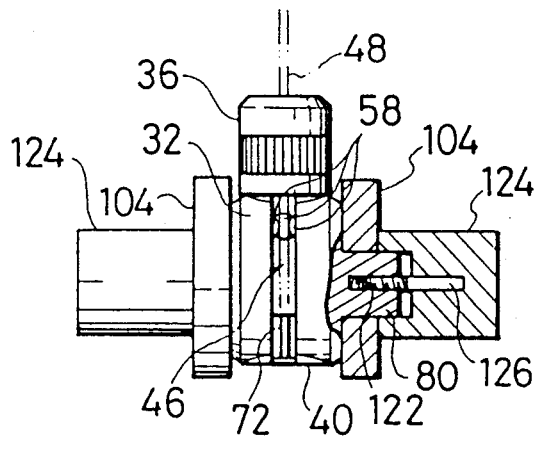
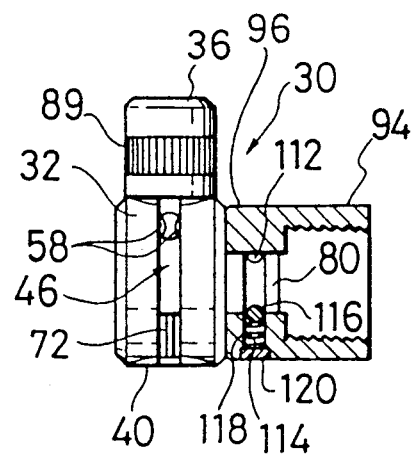
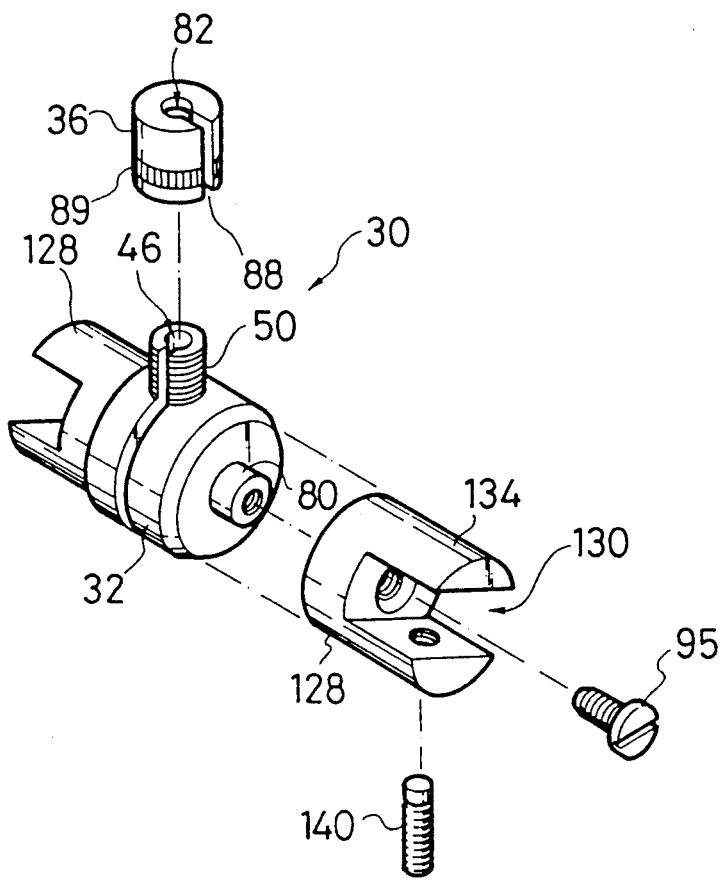

HANGING HOLDER AND HANGING STRUCTURE INCLUDING SAME

BACKGROUND OF THE INVENTION

This invention relates to a hanging holder and a hanging structure including the same, and more particularly to a hanging holder used for suspendingly or hangingly supporting an interior structural component such as a shelf, a display, a panel, a hanger or the like therethrough on a wire to form a hung structural assembly at a home, a window display or the like and a hanging structure adapted to hangingly support an interior structural component on a wire using the hanging holder.

Recently, a hanging holder is proposed which includes a holder body formed with an axially extending through-hole in a manner to be upwardly tapered or upwardly gradually decreased in diameter, a slide lock sleeve vertically slidably arranged in the holder body and a lock member. The slide lock sleeve is provided at the upper portion thereof with a projection adapted to project from the holder body and is constantly upwardly urged by means of a spring. Also, the slide lock sleeve movably supports balls or shoes therein and is formed with a vertical through-hole in a manner to extend in the axial direction thereof. The projection of the slide lock sleeve is formed on the outer periphery thereof with a thread. Correspondingly, the lock member is formed therein with a threaded hole, which is threadedly fitted on the threaded outer periphery of the projection. This results in the lock member restraining the slide lock sleeve so as to limit vertical movement of the slide lock sleeve with respect to the holder body, so that a wire which is vertically stretchedly arranged through the hanging holder may stationarily support an article such as a shelf, a panel or the like thereon through the hanging holder.

In the conventional hanging holder constructed as described above, the slide lock sleeve which is vertically movably arranged in the hollow holder body is formed into a hollow cylinder of which the peripheral wall is continuous. Thus, in order to engagedly hold the holder body in which the slide lock sleeve is arranged at a desired position of a wire, it is required to forcedly push the wire into the holder body in the downward direction from the upper open end of the slide lock sleeve against the spring and continue the pushing operation until the holder body reaches the desired position of the wire.

Also, the lock member is formed into a hollow cylinder of which the peripheral wall is continuous and closed with a top cover or lid. The lid is formed with a through-hole via which the wire is inserted into the lock member. Accordingly, the insertion of the wire through the lock member and holder body must be initiated at one end of the wire.

Thus, the above-described construction of the conventional hanging holder not only renders the operation of mounting and removing the hanging holder on and from a wire highly troublesome. Also, in the conventional hanging holder, once a hung structural assembly is formed by mounting or supporting an article such as a shelf or the like on a wire through the hanging holder, much labor and time are required for the operation of mounting an additional hanging holder on the wire or removing the previously mounted hanging holder from the wire which will be subsequently carried out. More particularly, when considering a hung structural assembly comprising, for example, three shelves or uppermost, intermediate and lowermost shelves which are hung through the hanging holders on four wires in a manner to be vertically spaced from each other, it is necessarily required to dismount the so-formed assembly when, for example, it is desired to arrange an additional shelf between the uppermost shelf and the intermediate shelf or remove the intermediate shelf from the assembly.

SUMMARY OF THE INVENTION

The present invention has been made in view of the foregoing disadvantages of the prior art.

Accordingly, it is an object of the present invention to provide a hanging holder which is capable of eliminating the necessity of dismounting a hung structural assembly once formed of an article such as a shelf or the like mounted on a wire using the hanging holder when it is desired to mount an additional hanging holder on the wire and/or remove the previously mounted hanging holder from the wire after the formation of the assembly.

It is another object of the present invention to provide a hanging holder which is capable of carrying out the removal and/or mounting with respect to a wire at any desired time and without dismounting a hung structural assembly once formed using the hanging holder.

It is a further object of the present invention to provide a hanging holder which is capable of being readily mounted at any desired position of a wire both before and after the wire is stretchedly arranged.

It is still another object of the present invention to provide a hanging holder which is capable of permitting the mounting of an additional article to be hung such as a shelf on a wire to be readily carried out at any desired time both before and after a hung structural assembly is formed of such an article using the hanging holder.

It is yet another object of the present invention to provide a hanging holder which is capable of eliminating the necessity of dismounting a hung structural assembly once formed of an article to be hung such as a shelf using the hanging holder when it is desired to remove the article from the assembly after the formation of the assembly.

It is even another object of the present invention to provide a hanging holder which is capable of permitting an increase or decrease in the number of articles to be hung such as shelves to be easily carried out after a hung structural assembly is once formed of such articles through the hanging holder.

It is a still further object of the present invention to provide a hanging structure using a hanging holder which is capable of readily connecting an article to be hung such as a shelf to the hanging holder when a hung structural assembly is to be formed of such an article through the hanging holder.

It is a yet further object of the present invention to provide a hanging structure which is capable of readily forming a hung structural assembly of an article such as a shelf while suspending it.

In accordance with one aspect of the present invention, a hanging holder is provided which includes a holder body formed at the central portion thereof with a vertical through-hole and including a tapered section of which the inner diameter is upwardly gradually decreased and a slide lock sleeve formed at the central portion thereof with a vertical through-hole and including a sleeve body slidably arranged in the holder body and a projection section mounted on the upper end of the sleeve body so as to upwardly project from the holder body; wherein the sleeve body includes a tapered section of which the outer diameter is upwardly gradually decreased so as to correspond to the tapered section of the holder body, the slide lock sleeve is provided with a chuck mechanism for selectively clamping a wire inserted through the vertical through-hole of the slide lock sleeve to hold the hanging holder with respect to the wire, the slide lock sleeve is constantly upwardly urged by a spring means, and the projection section of the slide lock sleeve is formed on the outer periphery thereof with a thread. The hanging holder also includes a lock member formed at the central portion thereof with a vertical threaded through-hole via which it is threadedly fitted on the outer periphery of the projection section of the slide lock sleeve and a bottom cover arranged on the bottom of the holder body for closing it and formed at the central portion thereof with a vertical through-hole. The hanging holder of the present invention is featured in that the holder body, slide lock sleeve, bottom cover and lock member are formed with slits so as to vertically extend therethrough and laterally extend to the vertical through-holes, respectively; the slits of the holder body, slide lock sleeve and bottom cover are arranged in a manner to be aligned with one another and communicate with one another; the slit of the lock member is arranged so as not to be aligned with the slits of the holder body, slide lock sleeve and bottom cover when the lock member is threadedly fitted on the slide lock sleeve for hanging operation; and at least one support is provided on the holder body for supporting an article to be hung therethrough on the holder body.

In accordance with another aspect of the present invention, a hanging structure is provided which includes a holder body formed at the central portion thereof with a vertical through-hole and including a tapered section of which the inner diameter is upwardly gradually decreased and a slide lock sleeve formed at the central portion thereof with a vertical through-hole and including a sleeve body slidably arranged in the holder body and a projection section mounted on the upper end of the sleeve body so as to upwardly project from the holder body; wherein the sleeve body includes a tapered section of which the outer diameter is upwardly gradually decreased so as to correspond to the tapered section of the holder body, the slide lock sleeve is provided with a chuck mechanism for selectively clamping a wire inserted through the vertical through-hole of the slide lock sleeve to hold the hanging holder with respect to the wire, the slide lock sleeve is constantly upwardly urged by a spring means, and the projection section of the slide lock sleeve is formed on the outer periphery thereof with a thread. The hanging holder also includes a lock member formed at the central portion thereof with a vertical threaded through-hole via which it is threadedly fitted on the outer periphery of the projection section of the slide lock sleeve and a bottom cover arranged on the bottom of the holder body for closing it and formed at the central portion thereof with a vertical through-hole. The hanging structure of the present invention is featured in that the holder body, slide lock sleeve, bottom cover and lock member are formed with slits so as to vertically extend therethrough and laterally extend to the vertical through-holes, respectively; the slits of the holder body, slide lock sleeve and bottom cover are arranged in a manner to be aligned with one another and communicate with one another; the slit of the lock member is arranged so as not to be aligned with the slits of the holder body, slide lock sleeve and bottom cover when the lock member is threadedly fitted on the slide lock sleeve for hanging operation; at least one support is provided on the holder body for supporting an article to be hung therethrough on the holder body; a connection member is rotatably connected to the support; and a fastening member is threadedly connected to the connection member and fastened to the article.

In accordance with present invention, a hanging structure is also provided which includes a holder body formed at the central portion thereof with a vertical through-hole and including a tapered section of which the inner diameter is upwardly gradually decreased and a slide lock sleeve formed at the central portion thereof with a vertical through-hole and including a sleeve body slidably arranged in the holder body and a projection section mounted on the upper end of the sleeve body so as to upwardly project from the holder body; wherein the sleeve body includes a tapered section of which the outer diameter is upwardly gradually decreased so as to correspond to the tapered section of the holder body, the slide lock sleeve is provided with a chuck mechanism for selectively clamping a wire inserted through the vertical through-hole of the slide lock sleeve to hold the hanging holder with respect to the wire, the slide lock sleeve is constantly upwardly urged by a spring means, and the projection section of the slide lock sleeve is formed on the outer periphery thereof with a thread. The hanging holder also includes a lock member formed at the central portion thereof with a vertical threaded through-hole via which it is threadedly fitted on the outer periphery of the projection section of the slide lock sleeve and a bottom cover arranged on the bottom of the holder body for closing it and formed at the central portion thereof with a vertical through-hole. The hanging structure of the present invention is featured in that the holder body, slide lock sleeve, bottom cover and lock member are formed with slits so as to vertically extend therethrough and laterally extend to the vertical through-holes, respectively; the slits of the holder body, slide lock sleeve and bottom cover are arranged in a manner to be aligned with one another and communicate with one another; the slit of the lock member is arranged so as not to be aligned with the slits of the holder body, slide lock sleeve and bottom cover when the lock member is threadedly fitted on the slide lock sleeve for hanging operation; at least one support is provided on the holder body for supporting an article to be hung therethrough on the holder body; and an article holder is mounted on the support to securely interposedly support the article between the support and the article holder.

Also, in accordance with the present invention, a hanging structure is provided which includes a holder body formed at the central portion thereof with a vertical through-hole and including a tapered section of which the inner diameter is upwardly gradually decreased and a slide lock sleeve formed at the central portion thereof with a vertical through-hole and including a sleeve body slidably arranged in the holder body and a projection section mounted on the upper end of the sleeve body so as to upwardly project from the holder body; wherein the sleeve body includes a tapered section of which the outer diameter is upwardly gradually decreased so as to correspond to the tapered section of the holder body, the slide lock sleeve is provided with a chuck mechanism for selectively clamping a wire inserted through the vertical through-hole of the slide lock sleeve to hold the hanging holder with respect to the wire, the slide lock sleeve is constantly upwardly urged by a spring means, and the projection section of the slide lock sleeve is formed on the outer periphery thereof with a thread. The hanging holder also includes a lock member formed at the central portion thereof with a vertical threaded through-hole via which it is threadedly fitted on the outer periphery of the projection section of the slide lock sleeve and a bottom cover arranged on the bottom of the holder body for closing it and formed at the central portion thereof with a vertical through-hole. The hanging structure of the present invention is featured in that the holder body, slide lock sleeve, bottom cover and lock member are formed with slits so as to vertically extend therethrough and laterally extend to the vertical through-holes, respectively; the slits of the holder body, slide lock sleeve and bottom cover are arranged in a manner to be aligned with one another and communicate with one another; the slit of the lock member is arranged so as not to be aligned with the slits of the holder body, slide lock sleeve and bottom cover when the lock member is threadedly fitted on the slide lock sleeve for hanging operation; at least one support is provided on the holder body for supporting an article to be hung therethrough on the holder body; and a connecting and fastening member is rotatably connected to the support and fastened to the article to securely hold the article therethrough on the support.

Further, in accordance with the present invention, a hanging structure is provided which includes a holder body formed at the central portion thereof with a vertical through-hole and including a tapered section of which the inner diameter is upwardly gradually decreased and a slide lock sleeve formed at the central portion thereof with a vertical through-hole and including a sleeve body slidably arranged in the holder body and a projection section mounted on the upper end of the sleeve body so as to upwardly project from the holder body; wherein the sleeve body includes a tapered section of which the outer diameter is upwardly gradually decreased so as to correspond to the tapered section of the holder body, the slide lock sleeve is provided with a chuck mechanism for selectively clamping a wire inserted through the vertical through-hole of the slide lock sleeve to hold the hanging holder with respect to the wire, the slide lock sleeve is constantly upwardly urged by a spring means, and the projection section of the slide lock sleeve is formed on the outer periphery thereof with a thread. The hanging holder also includes a lock member formed at the central portion thereof with a vertical threaded through-hole via which it is threadedly fitted on the outer periphery of the projection section of the slide lock sleeve and a bottom cover arranged on the bottom of the holder body for closing it and formed at the central portion thereof with a vertical through-hole. The hanging structure of the present invention is featured in that the holder body, slide lock sleeve, bottom cover and lock member are formed with slits so as to vertically extend therethrough and laterally extend to the vertical through-holes, respectively; the slits of the holder body, slide lock sleeve and bottom cover are arranged in a manner to be aligned with one another and communicate with one another; the slit of the lock member is arranged so as not to be aligned with the slits of the holder body, slide lock sleeve and bottom cover when the lock member is threadedly fitted on the slide lock sleeve for hanging operation; a support is provided which comprises a flange arranged on the lower end of the holder body for supporting an article to be hung therethrough on the holder body; a connecting and fastening member is provided which comprises a connection section formed with a vertical through-hole via which the connection section is fitted on the holder body and supported on the flange and a fastening section to which the article is fastened; and the connecting and fastening member is formed with a slit so as to laterally extend to the through-hole of the connection section and vertically extend over the vertical length thereof.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 10 is a partially sectional front elevation view showing a modification of the embodiment shown in FIG. 1;

FIG. 12 is a partially sectional front elevation view of the embodiment shown in FIG. 11;

FIG. 13 is an exploded perspective view showing a further embodiment of each of a hanging holder and a hanging structure according to the present invention;

DETAILED DESCRIPTION OF THE PREFERRED EMBODIMENTS

Figure 1:
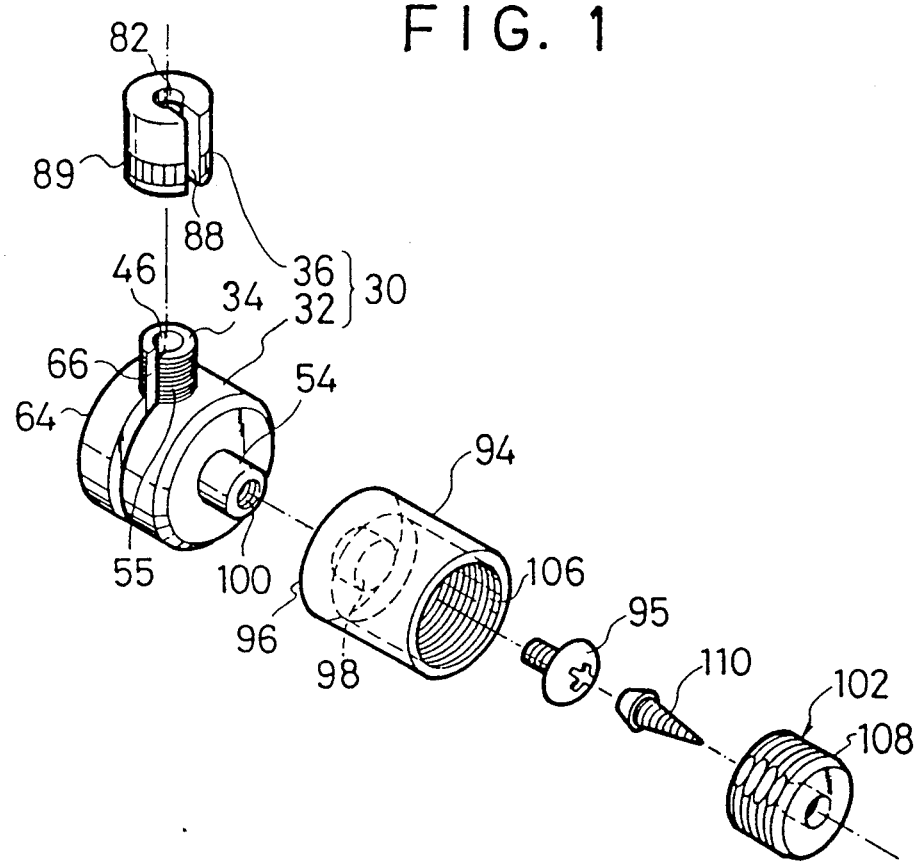
FIG. 1 is an exploded perspective view showing an embodiment of each of a hanging holder and a hanging structure according to the present invention.
Figure 2:
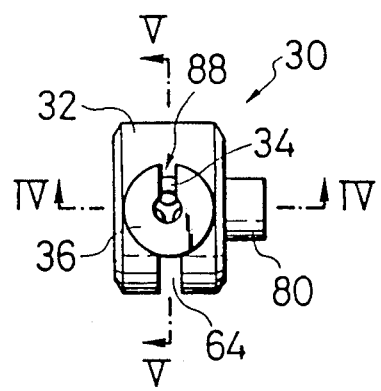
FIG. 2 is a plan view of the hanging holder shown in FIG. 1.
Figure 3:
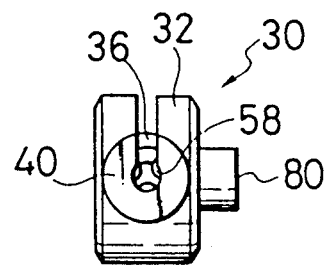
FIG. 3 is a bottom view of the hanging holder shown in FIG. 1.

Now, a hanging holder and a hanging structure including such a hanging holder according to the present invention will be described hereinafter with reference to the accompanying drawings.

FIGS. 1 to 7 show an embodiment of a hanging holder according to the present invention.

A hanging holder of the illustrated embodiment, which is generally designated by reference numeral 30 generally includes a holder body 32, a slide lock sleeve 34 and a lock member 36.

Figure 4:
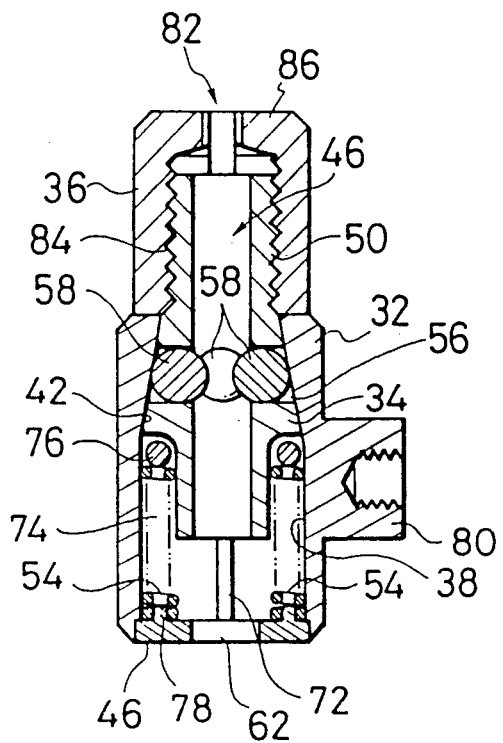
FIG. 4 is a vertical sectional view taken along line IV—IV of FIG. 2.

The holder body 32, as shown in FIG. 1, is formed into a shape like a sideways cylinder and, as shown in FIG. 4, formed at the central portion thereof with a vertically extending through-hole 38. The lower end of the through-hole 38 is covered with a bottom cover 40 arranged on the bottom of the holder body 32. The through-hole 38 of the holder body 32 includes a tapered section 42 which is formed in a manner to be upwardly tapered or gradually decreased in diameter in the upward direction. In the illustrated embodiment, the tapered section 42 may be formed at the upper portion of the through-hole 38.

The slide lock sleeve 34 includes a sleeve body 44 and a projection section 50 provided on the upper end of the sleeve body 44 and is formed at the central portion thereof with a vertically extending through-hole 46 via which a wire 48 is inserted. The sleeve body 44 is formed into a shape substantially corresponding to the through-hole 38 of the holder body 32 and slidably arranged in the through-hole 38. Thus, the sleeve body 44 is formed at the upper portion thereof into a tapered section 52 (FIG. 5) of which the outer diameter is gradually decreased. In the through-hole 38 of the holder body 32 are arranged a plurality of springs 54 so as to constantly upwardly urge the slide lock sleeve 34. In the illustrated embodiment, for this purpose, two such springs 54 each taking the form of a coiled spring are interposedly arranged between the sleeve body 44 of the slide lock sleeve 34 and the bottom cover 40 of the holder body 32. The projection section 50 is arranged so as to upwardly project from the holder body 32 when the coiled springs 54 are restored. The projection section 50 is formed on the outer peripheral surface thereof with a thread as indicated at reference numeral 55 in FIG. 1. The tapered section 52 of the sleeve body 44 is provided with a plurality of radially extending lateral through-holes 56 in a manner to be spaced from one another in the circumferential direction of the section 52, in which balls 58 are movably inserted, respectively. In the illustrated embodiment, three such through-holes 56 are formed. The balls 58 respectively arranged in the through-holes 56 cooperate together to serve as a chuck mechanism for selectively clamping the wire 48 inserted via the through-hole 46 of the sleeve body 44. More particularly, when an operator does not force the slide lock sleeve 34 into the holder body 32 against the coiled springs 54, the chuck mechanism constituted by the balls 58 clamps the wire 48 inserted through the slide lock sleeve 34 to positively prevent the holder body 32 from slipping down along the wire 48 in a direction indicated at an arrow 60 in FIG. 7 or in the downward direction, because the tapered inner surface of the tapered section 42 of the holder body 32 exhibits a wedge action to inwardly force the balls 58; whereas forcing of the slide lock sleeve 34 in the downward direction against the coiled springs 54 causes the balls 58 to be released from the wedge action of the tapered section 42, to thereby be movable in the through-holes 56, so that the holder body 32 may be moved along the wire 48. The bottom cover 40 arranged at the bottom of the holder body 32 is formed at the central portion thereof with a vertical through-hole 62 in a manner to be aligned and communicate with the vertical through-hole 46 of the slide lock sleeve 34, so that the wire 48 may be inserted through the slide lock sleeve 34.

The holder body 32, slide lock sleeve 34 and bottom cover 40 are formed with slits 64, 66 and 68 so as to vertically extend therethrough in the axial direction thereof and in a manner to be aligned and communicate with one another, respectively. The slits 64, 66 and 68 are arranged so as to laterally extend to the vertical through-holes 38, 46 and 62 of the holder body 32, slide lock sleeve 34 and bottom cover 40, resulting in communicating therewith, respectively. The coiled springs 54 are positioned in the holder body 32 so as not to block the mutual communication among the slits 64, 66 and 68.

Figure 5:
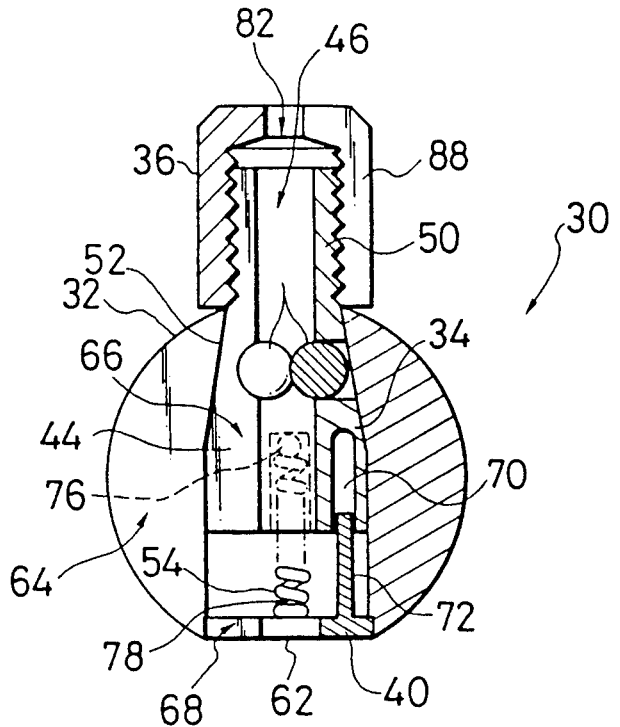
FIG. 5 is a vertical sectional view taken along line V—V of FIG. 2.
Figure 6:
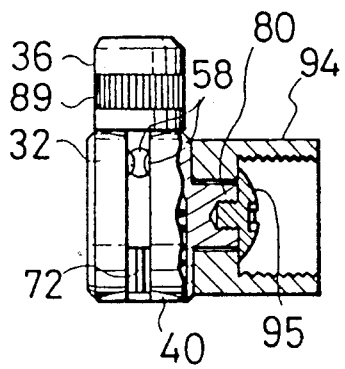
FIG. 6 is a front elevation view partly in section showing the hanging holder of FIG. 1 to which a connection member is connected.
Figure 7:
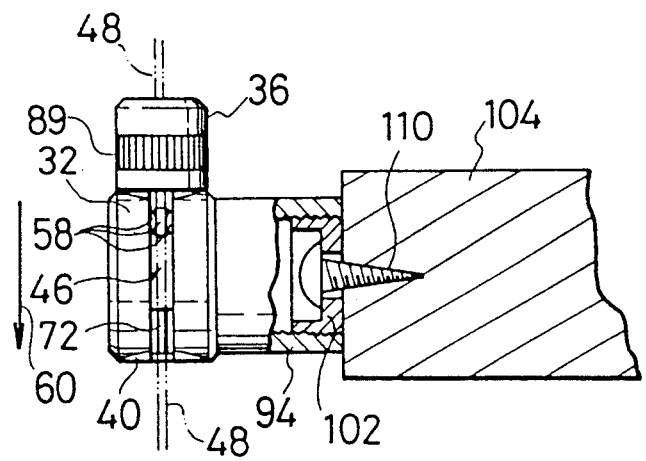
FIG. 7 is a partially cutaway front elevation view showing the hanging structure of FIG. 1 through which a shelf is hangingly supported on a wire.

In order to prevent the slide lock sleeve 34 from rotating relative to the holder body 32, resulting in keeping the slits 64, 66 and 68 aligned with each other, an alignment holding means is preferably provided. For this purpose, the alignment holding means, as shown in FIG. 5 may comprise an elongated vertical aperture 70 formed on the lower end of the sleeve body 44 of the slide lock sleeve 34 so as to be positioned opposite to the slit 66 and a holding pin 72 provided on the bottom cover 40 in a manner to upwardly extend therefrom and be aligned with the aperture 70 and fitted in the aperture 70. In this instance, the coiled springs 54 may be arranged in a manner to be spaced at angular intervals from both the slit 66 and aperture 70. In the illustrated embodiment, two such coiled springs 54 are provided as described above, therefore, the coiled springs may be positioned in a manner to be angularly spaced by 90 degrees from the slit 66 and aperture 70, as shown in FIG. 4. The coiled springs 54 may be arranged in recesses 74 formed on the outer peripheral surface of the lower end portion of the sleeve body 44. In each of the recesses 74 may be received a spring seat 76 for the upper end of the coiled spring 54. Also, on the bottom cover 40 are provided spring holders 78 each serving as both a positioning means and a holder for the lower end of the coiled spring 54. Such construction permits each of the coiled springs 54 to effectively and positively exhibit its function. The spring seat 76 and spring holder 78 may preferably comprise a ball and a pin, respectively. The use of such a pin for each of the spring holders 78 permits the pin to exhibit the function of the holding pin 72 as well as its own function, because the pin 78 permits each of the coiled springs 54 to serve as a stopper for the slide lock sleeve 34. This eliminates the necessity of arranging the holding pin 72 separate from the spring holders 78 and therefore arranging the aperture 70, resulting in highly simplifying the construction of the hanging holder 30 while ensuring its positive operation.

In the illustrated embodiment, the slit 64 of the holder body 32 is formed at one of both semi-circular sides of the holder body 32. On one of both flat sides of the holder body 32 is provided a support 80 in the form of a cylinder or shaft serving as an article supporting section of the hanging holder 30. The support cylinder or shaft 80 is formed integral with the holder body 32 and positioned at the central portion of the one flat side of the holder body 32 so as to laterally outwardly project therefrom. In the illustrated embodiment, the support shaft 80 is adapted to indirectly support an article to be hung such as a shelf, a panel or the like, as described hereinafter.

The hanging holder 30 of the illustrated embodiment further includes the lock member 36 briefly described above. The lock member 36 is formed into a shape like a hollow cylinder. More particularly, the lock member 36 is formed at the central portion thereof with a vertical through-hole 82 so as to extend in the axial direction thereof. Also, the lock member 36 is formed on the inner periphery periphery thereof defining the through-hole 82 with a thread 84, through which the lock member 36 is threadedly fitted on the the projection section 50 of the slide lock member 34, resulting in the through-hole 82 of the lock member 36 communicating with the through-hole 46 of the slide lock sleeve 34. In the illustrated embodiment, the lock member 36 is provided thereon with an upper lid 86, and the through-hole 82 is formed so as to penetrate the lid 86 as well as the lock member 36. The lock member 36 is formed into a length sufficient to permit it to be abutted at the lower end thereof against the upper end of the holder body 32 when it is threadedly fitted on the slide lock sleeve 34 which is hanging an article such as a shelf or the like through the wire 48.

The lock member 36 is formed with a slit 88 so as to vertically extend therethrough in the axial direction thereof and laterally extend to the vertical through-hole 82 of the lock member 36 to communicate therewith. The slit 88 is so arranged that it may not be aligned with the slit 66 of the slide lock sleeve 34 when the lock member 36 is threadedly fitted on the slide lock sleeve 34 which is hanging an article such as a shelf or the like through the wire 48. As will be readily noted from the above-described construction of the slide lock sleeve 34, a length by which the projection section 50 projects from the holder body 32 is varied depending upon the diameter of the wire 48, so that the portion of the through-hole 82 via which the lock member 36 is threadedly fitted on the projection section 50 is varied in length, resulting in the position of the slit 88 being varied depending upon the diameter of the wire 48. Thus, the lock member 36 is selected depending upon the diameter of the wire 48 so as to prevent the slit 88 of the lock member 36 from being aligned with the slit 66 of the slide lock sleeve 34. Alternatively, for this purpose, the position of the slit 88 of the lock member 36 positioned with respect to the projection section 50 when the threaded fitting of the lock member 36 on the projection section 50 is initiated may be varied depending upon the wire 48. The lock member is knurled on the outer surface thereof as indicated at reference numeral 89 in FIGS. 1, 6 and 7. It is of course that the lock member 36 which is free of the lid 86 may be conveniently used.

Now, the manner of operation of the hanging holder of the illustrated embodiment will be described hereinafter with reference to FIGS. 1 to 7.

When the hanging holder 30 is to be mounted on the wire 48, the lock member 36 is released from the slide lock sleeve 34 or loosened so as to cause the slit 88 of the lock member 36 to be aligned with the slits 64 and 66 of the holder body 32 and slide lock sleeve 34 and then the slide lock sleeve 34 is forcedly pushed down against the coiled springs 54, so that the wire 48 may be inserted through the hanging holder 30 from the slits of the holder body 32 and slide lock sleeve 34 without being obstructed by the balls 58. Then, when the slide lock sleeve 34 is released from the downward forcing, the coiled springs 54 upwardly forces the slide lock sleeve 34 to cause it to be upwardly moved relative to the holder body 32, so that the tapered section 52 of the holder body 32 inwardly forces the balls 58 to cause them to clamp the wire 48. Then, the lock member 36 is fitted through the slit 88 on the wire 48 and downwardly moved along the wire 48, resulting in being threadedly fitted on the slide lock sleeve 34. The removal of the hanging holder 30 from the wire 48 may be accomplished by reversing the above-described procedure.

Thus, the hanging holder 30 of the illustrated embodiment can readily accomplish the mounting and removal with respect to the wire 48 at any desired time without requiring much time and labor.

Also, in the hanging holder 30 of the embodiment, the support 80 is provided on the side of the holder body 32, so that an article to be hung such as a shelf, a panel or the like may be mounted on the holder body 32 from the side of the hanging holder 30. Thus, when it is desired to hangingly support an additional shelf on the portion of the wire 48 between two shelves previously supported thereon, it can be carried out without removing the previously supported shelves from wire.

The mounting and removal of an article with respect to the wire 48 may be accomplished both while the hanging holder 33 is held on the wire through the lock member 36 and while it is released from the locking on the wire. However, the above-described construction of the hanging holder of the illustrated embodiment permits force for moving the holder body 32 along the wire 48 to be readily applied to the holder body during the holder mounting or removing operation, so that the operation may be conveniently carried out while locking the hanging holder on the wire. The positional adjustment of the hanging holder 30 with respect to the wire 48 after the mounting may be readily carried out by loosening the lock member 36. After a hung structural assembly is so formed, the lock member is fastened onto the slide lock sleeve 34 to cause the hanging holder to be securely fixedly held on the wire, resulting in effectively preventing the falling-off of the article from the wire due to misoperation of the hanging holder, collision with the article or the like. Further, the slit 88 of the lock member 36 is arranged so as not to be aligned with the slit 66 of the slide lock sleeve 34 when the former is fastened onto the latter, to thereby effectively prevent the wire from being released from the hanging holder. Moreover, in the illustrated embodiment, the alignment holding means is provided so as to prevent the slide lock sleeve 34 from rotating relative to the holder body 32. This permits the mounting and removal of the hanging holder 30 with respect to the wire 48 to be readily carried out.

Now, an embodiment of a hanging structure according to the present invention including the hanging holder 30 of the embodiment described above will be described hereinafter with reference to FIGS. 8 and 9 as well as FIGS. 1 to 7.

A hanging structure of the illustrated embodiment generally indicated at reference numeral 92 includes, in addition to the above-described holder body 32, a connection member 94 rotatably connected to the support 80 in the form of a shaft or cylinder. In the illustrated embodiment, the connection member 94 is rotatably connected at one end thereof through a screw 95 to the support shaft 80. For this purpose, the connection member 94 is closed at one end thereof with a cover 96, which is provided at the central portion thereof with a through-hole 98 fitted on the support shaft 80 of the holder body 32. The support shaft 80 is formed at the outer end thereof with a threaded hole 100 in which the screw 95 is threadedly fitted via the through-hole 98 of the cover 96. The hanging structure 92 also includes a fastening member 102 threadedly engaged with the connection member 94 and fastened to an article 104 to be hung such as a shelf or the like to hang it through the wire 48, to thereby form a hung structural assembly. For this purpose, in the illustrated embodiment, the connection member 94 is formed into a cylindrical shape and formed on the inner or outer peripheral surface thereof with a thread 106 and correspondingly the fastening member 102 is formed on the outer or inner peripheral surface with a thread 108. More specifically, in the illustrated embodiment, the thread 106 is provided on the inner periphery of the connection member 94 and the thread 108 is provided on the outer periphery of the fastening member 102, so that the connection member 94 and fastening member 102 comprise an internally threaded member and an externally threaded member, respectively. The connection member 94 is formed into substantially the same outer diameter as the holder body 32. Alternatively, the connection member 94 and fastening member 102 may comprise an externally threaded member and an internally threaded member which may have substantially the same outer diameter as the holder body 32, respectively.

Figure 8:
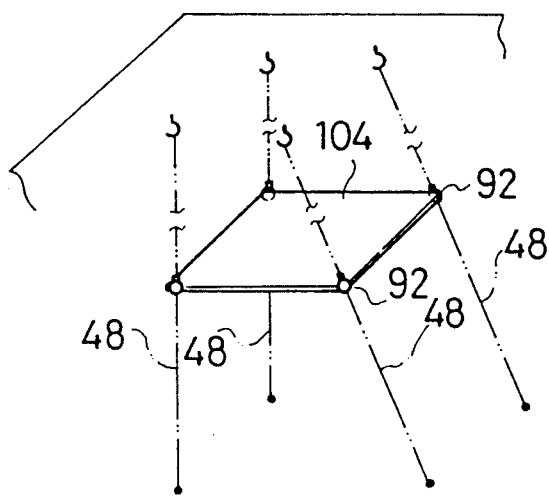
FIG. 8 is a schematic perspective view showing an example of the manner of use of the hanging holder of FIG. 1.
Figure 9:
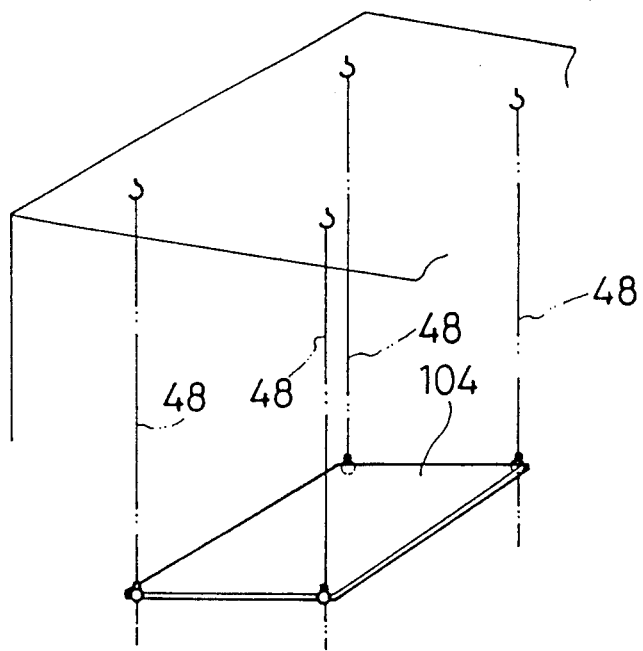
FIG. 9 is a schematic perspective showing another example of the manner of use of the hanging structure of FIG. 1.

The hanging structure of the illustrated embodiment constructed as described above may be operated in such manners as shown in FIGS. 8 and 9. For example, when such a hung structural assembly as shown in FIG. 8 is to be constructed, four wires 48 are stretchedly arranged between a ceiling and a floor. In FIG. 8, two wires are vertically stretched and the remaining two wires are obliquely stretched. Then, the hanging holder 30 to which the connection member or internally threaded member 94 is previously connected is mounted on each of the wires 48 so as to be positioned at the same height and then fixed on the wire through the lock member 36. Thereafter, a shelf of a rectangular shape which is an example of an article 104 to be hung and on which the fastening member or externally threaded member 102 is mounted through four corners thereof by means of screws 110 is securely connected to each of the hanging holders 30 by rotating the internally threaded member 94 with respect to the hanging holder 30 and externally threaded member 102. The hanging holder 30 which is connected to each of the obliquely arranged wires 48 are likewise obliquely arranged, however, the internally threaded member 94 is rotated with respect to the hanging holder 30, resulting in the shelf 104 being horizontally held.

When a shelf 104 of a rectangular shape is to be obliquely mounted on four wires 48 as shown in FIG. 9, four hanging holders 30 are securely connected to the four wires 48 at desired heights in substantially the same manner as described above with reference to FIG. 8, respectively. Then, the shelf 104 is mounted on the wires through the hanging holders 30 as described above. In this instance, the angle of rotation of the internally threaded member 94 with respect to the hanging holder 30 is determined depending upon the mutual relationships among the vertical positions of the hanging holders 30, so that the slanting angle of the shelf 104 may be determined, resulting in being stabilized.

In the illustrated embodiment, the support 80 is provided on one side of the holder body 32. However, two such supports may be provided on both sides of the holder body in a manner to be opposite to each other with the holder body 32 being interposed therebetween.

FIG. 10 shows a modification of the hanging structure described above with reference to FIGS. 1 to 9. In the hanging structure described above, the support 80 is formed into a shape like a shaft or cylinder and provided therein with the threaded hole 100 and the internally threaded member 94 is fitted on the support shaft 80. Then, the internally threaded member 94 is rotatably connected to the support shaft 80 by means of the screw 95. In the modification shown in FIG. 10, a support 80 is formed into a shape like a solid cylinder or a hollow cylinder and provided on the outer periphery thereof with a recess 112 in a manner to extend in the circumferential direction thereof. A cover 96 of an internally threaded member 94 which is formed with a through-hole 98 and fitted on the support 80 is formed with a hole 114 in a manner to positionally correspond to the recess 112 and radially extend to the through-hole 98. In the radial hole 114 are received a ball 116 and a coiled spring 118 for radially inwardly forcing the ball 116 in order, and the outer end of the hole 114 is closed with a lid 120. Such construction permits the connection member 94 to be rotatably connected to the support 80.

Figure 11:
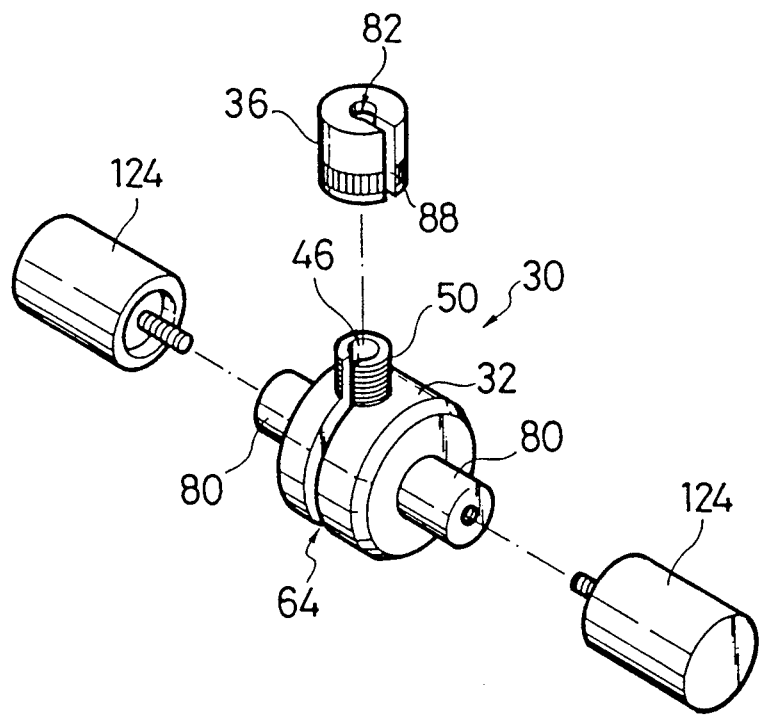
FIG. 11 is an exploded perspective view showing another embodiment of each of a hanging holder and a hanging structure according to the present invention.

FIGS. 11 and 12 show another embodiment of a hanging holder according to the present invention. A hanging holder of the illustrated embodiment generally indicated at reference numeral 30 includes a pair of supports 80 arranged on both sides of a holder body 32 and each formed into a shape like a shaft. In the illustrated embodiment, the support shafts 80 are provided on flat sides of the holder body 32 with the holder body being interposed therebetween and each are adapted to directly support an article to be hung such as a shelf or the like thereon. The remaining part of the hanging holder 30 may be constructed in substantially the same manner as the above-described embodiment. The support shafts each are formed therein with a threaded hole 100.

Now, a hanging structure including the hanging holder of the so-constructed embodiment and the manner of operation of the hanging structure will be described hereinafter with reference to FIGS. 11 and 12.

FIG. 12 shows an example of a hung structural assembly wherein two wires 48 vertically hang two boards 104 in parallel with each other through two hanging holders. The boards 104 each are formed at each of both ends thereof with a through-hole 122, through which each of the boards 104 is fittedly mounted on the same side support shafts 80 of the adjacently arranged hanging holders 30 securely mounted respectively on the two adjacent wires 48. FIG. 12 shows only one end of each of the boards 104. Then, an article holder 124 is fitted on each of the support shafts 80 and forcedly fastened to the support shaft 80 by means of a screw 126 to securely interpose each end of the board 104 between the holder body 32 and the article holder 124.

In the illustrated embodiment, the support 80 is arranged on each of both sides of the holder body 32. However, it may be provided on only one side of the holder body.

FIG. 13 shows another embodiment of a hanging holder according to the present invention. A hanging holder of the illustrated embodiment generally indicated at reference numeral 30 includes a pair of supports 80 arranged on both sides of a holder body 32 and each formed into a cylindrical shape like a shaft. In the illustrated embodiment, the support shafts 80 are provided on flat sides of the holder body 32 in a manner to be opposite to each other with the holder body 32 being interposed therebetween and are adapted to indirectly support an article to be hung such as a shelf, a board or the like thereon. The remaining part of the hanging holder 30 may be constructed in substantially the same manner as the embodiment described above with reference to FIGS. 1 to 7. The support shafts 80 each are formed therein with a threaded hole 100.

Now, a hanging structure including the hanging holder of the so-constructed embodiment and the manner of operation of the hanging structure will be described hereinafter with reference to FIGS. 13 to 15.

Figure 14:
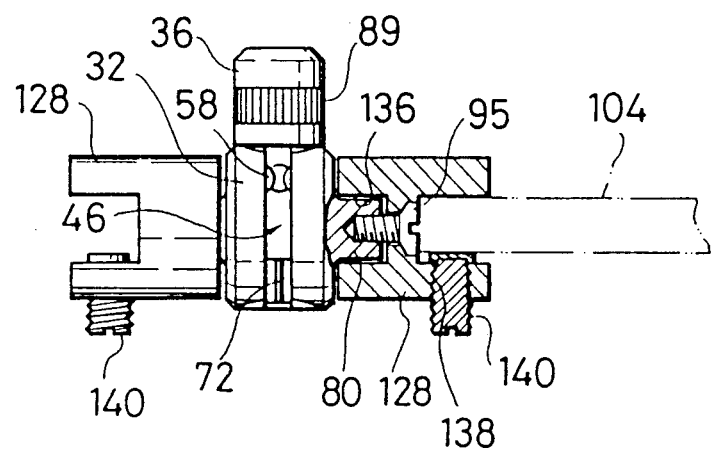
FIG. 14 is a partially sectional front elevation view of the embodiment shown in FIG. 13.
Figure 15:
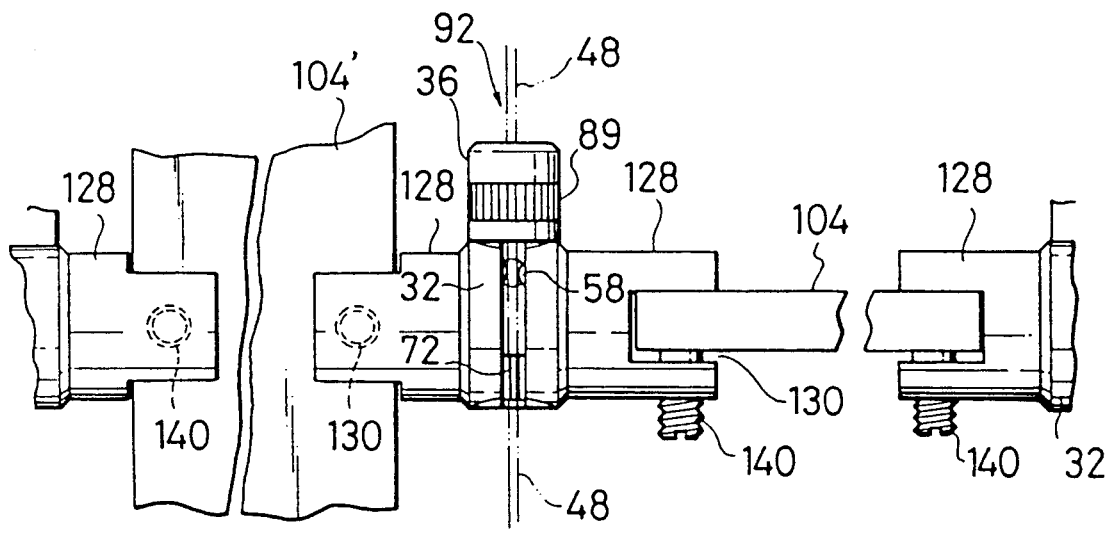
FIG. 15 is a front elevation view showing the manner of use of the embodiment shown in FIG. 13.

A hanging structure 92 shown in FIGS. 13 to 15 includes a connecting and fastening member 128 like a cylinder which is formed into a U-shape in section, resulting in being provided with a holding groove 130. Thus, the connecting and fastening member 128 includes a bar or bottom section 132 and a pair of leg sections 134 which extend from the bottom section 132 in parallel to each other and between which the holding groove 130 is defined. The bottom section 132 is formed at the central portion thereof with a through-hole 136 via which the member 128 is fitted on the support shaft 80 and rotatably connected to the support shaft 80 by means of a screw 95. In the illustrated embodiment, the through-hole 136 comprises a stepped through-hole. An article 104 such as a shelf, a board or the like is inserted at one side or end thereof in the holding groove 130 defined between the leg sections 134. One of the leg sections 134 is provided with a threaded through-hole 138, via which a fastening screw 140 is threadedly inserted so as to project at the distal end thereof into the holding groove 130, to thereby securely hold the article 104 in the holding groove 130. The fastening screw 140 may be made of a suitable plastic material.

In the illustrated embodiment, the threaded portion of the screw 95 has a length sufficient to permit a gap to be defined between the support shaft 80 and the connecting and fastening member 128 in the axial direction thereof when the screw 95 is fully threadedly inserted into the through-hole 136, resulting in ensuring the rotatable connection between the support shaft 80 and the member 128.

Now, the manner of operation of the so-constructed hanging structure will be described hereinafter in connection with an example wherein a glass plate is hung therethrough by means of a wire.

First, a glass plate 104 is inserted at one end thereof in the holding groove 130 of the connecting and fastening member 128 preferably through a cushioning means (not shown). Then, the fastening screw 140 is threadedly inserted via the through-hole 138 of the leg section 134 to forcedly press the glass plate 104 against the inner surface of the opposite leg section 134. Likewise, the opposite end or side of the glass plate 140 is securely held by an adjacent holding structure. In the illustrated embodiment, the connecting and fastening member 128 is arranged on each of both sides of the holder body 32, so that the hanging structure of the embodiment may horizontally support the glass plate 104 through one connecting and fastening member 128 and vertically support a panel 104′ through the other connecting and fastening member 128.

Figure 16:
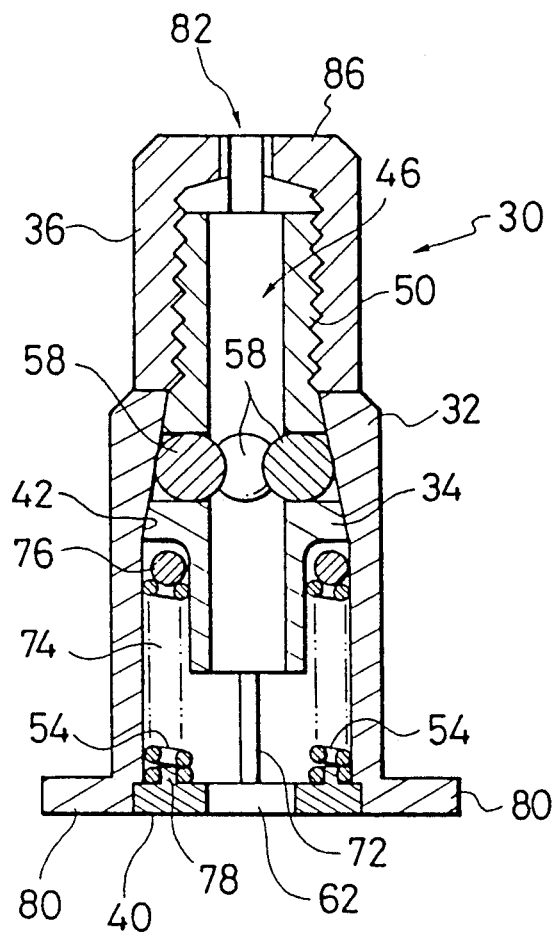
FIG. 16 is a vertical sectional view showing still another embodiment of a hanging holder according to the present invention.

FIG. 16 shows a further embodiment of a hanging holder according to the present invention. A hanging holder of the illustrated embodiment generally designated by reference numeral 30 includes a holder body 32 formed into a cylindrical shape and a support 80 comprising a flange mounted on the lower end of the holder body 32. The remaining part of the embodiment may be constructed in substantially the same manner as the embodiment shown in FIGS. 1 to 7.

Figure 17:
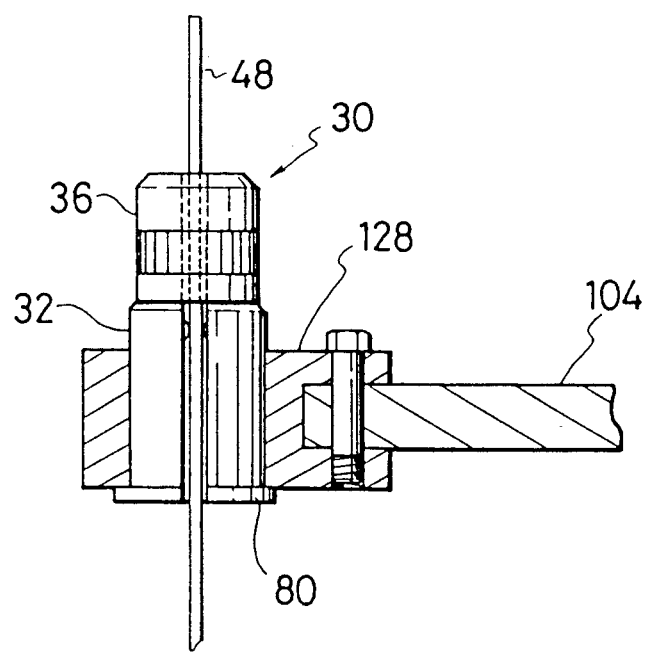
FIG. 17 is a front elevation view partly in section showing a hanging structure including the hanging holder shown in FIG. 16.
Figure 18:
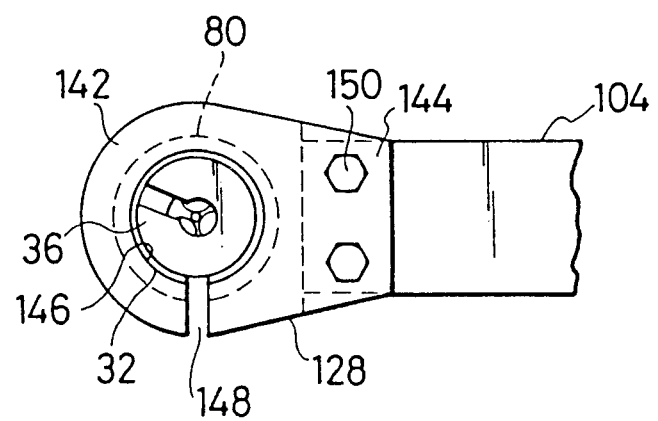
FIG. 18 is a plan view of the hanging structure shown in FIG. 17.

FIGS. 17 and 18 show a hanging structure including the so-constructed hanging holder and the manner of operation of the hanging structure. The hanging structure includes a connecting and fastening member 128 which comprises a connection section 142 formed into a substantially annular shape and a fastening section 144 laterally extending from the connection section 142. The connection section 142 is formed with a through-hole 146 via which the member 128 is fitted on the holder body 32 and supported on the support flange 80. The connection section 142 is also formed with a slit 148 so as to laterally extend to the through-hole 146 and vertically extend over its whole vertical length. To the fastening section 144 is fastened one end of an article 104 to be hung such as a shelf or the like. In the illustrated embodiment, the article 104 is fastened to the fastening section 144 by means of screws or bolts 150. A wire 48 is inserted slits of the hanging holder 30 and then is inserted through the slit 148 of the connecting and fastening member 128 to which the article 104 is previously fastened. Then, the connecting and fastening member 128 is securely connected through the support flange 80 to the hanging holder 30.

Figure 19:
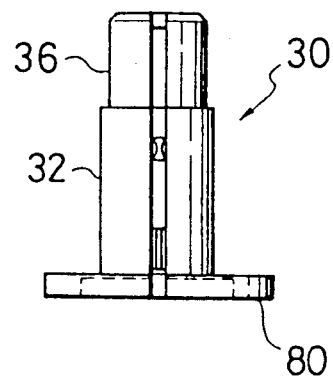
FIG. 19 is a front elevation view showing a modification the hanging holder shown in FIG. 16.
Figure 20:
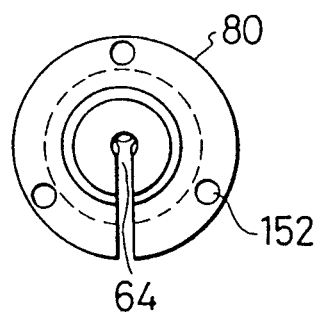
FIG. 20 is a plan view of the hanging holder shown in FIG. 19.
Figure 21:
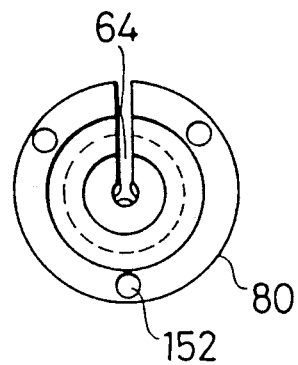
FIG. 21 is a bottom view of the hanging holder shown in FIG. 19.
Figure 24:
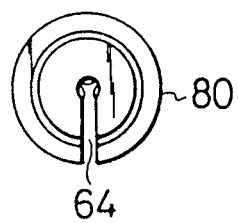
FIG. 24 is a plan view of the hanging holder shown in FIG. 22.
Figure 22:
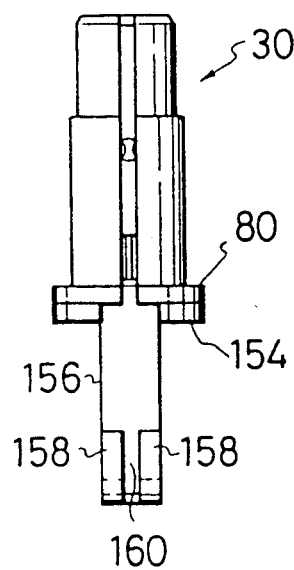
FIG. 22 is a front elevation view showing another modification of the hanging holder shown in FIG. 16.
Figure 23:
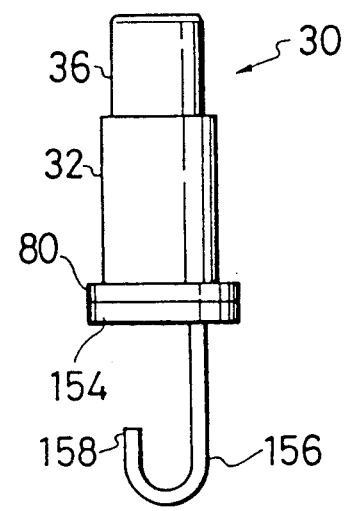
FIG. 23 is a side elevation view of the hanging holder shown in FIG. 22.
Figure 25:
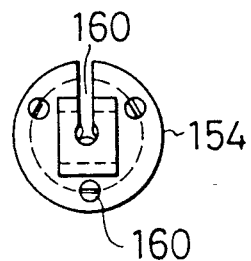
FIG. 25 is a bottom view of the hanging holder shown in FIG. 22.

FIGS. 19 to 21 illustrate a modification of the hanging holder shown in FIG. 17. In a hanging holder 30 of the modification, a support flange 80 is formed with at least one mounting hole 152. In the modification, three such mounting holes 152 are arranged at substantially equal intervals. A mounting and fastening member (not shown) is bolted through the mounting holes 152 to the support flange 80. Such construction effectively prevents the mounting and fastening member from being released from the hanging holder 30 even when upward force is applied to an article. The remaining part of the modification may be constructed in substantially the same manner as the embodiment shown in FIG. 17.

FIGS. 22 to 25 show another modification of the hanging holder shown in FIG. 17. In a hanging holder of the modification, a second flange 154 provided on the lower surface thereof with a hook 156 is mounted on the lower surface of a support flange 80. The hook 156 may be used for supporting an article other than that supported through the support 80 on a holder body 32. The hook 156 includes a curved distal end 158, which is formed with a slit 160 extending in the longitudinal direction thereof. Reference numeral 161 designates mounting holes formed at the flange 154.

Figure 28:
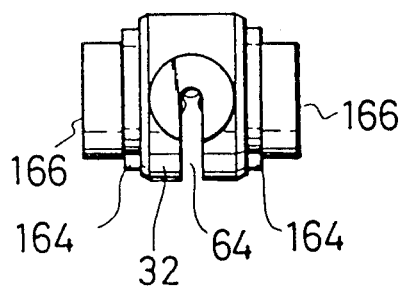
FIG. 28 is a plan view of the hanging holder shown in FIG. 26.
Figure 26:
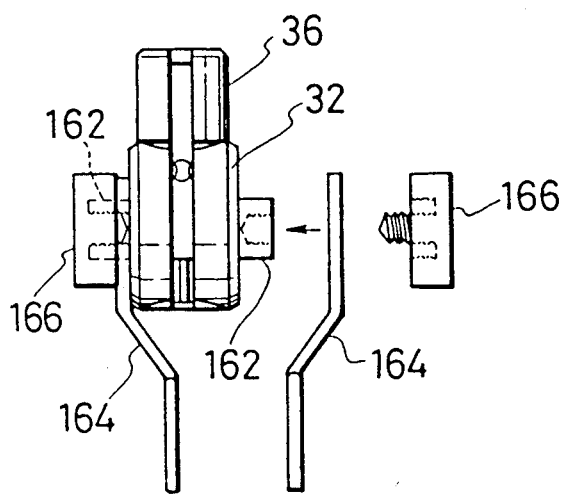
FIG. 26 is a front elevation view showing a still further embodiment of each of a hanging holder and a hanging structure according to the present invention.
Figure 27:
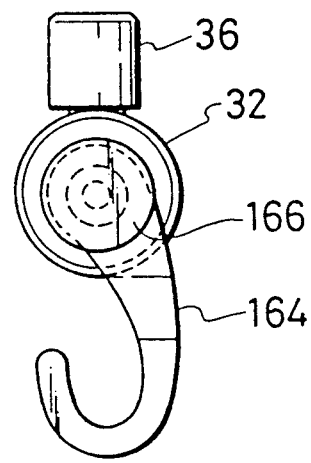
FIG. 27 is a side elevation view of the hanging structure shown in FIG. 26.

FIGS. 26 to 28 show a still further embodiment of a hanging holder according to the present invention. In a hanging holder of the illustrated embodiment generally indicated at reference numeral 30, a support 80 is arranged on each of both flat sides of a holder body 32 constructed in substantially the same manner as the embodiment shown in FIGS. 1 to 7. The supports 80 each comprise a boss 162 arranged on each of both sides of the holder body 32 and a hook 164 securely mounted on said boss. The hook 164 may be fittedly mounted on said boss by means of a bolt 166 in a manner to be interposed between the holder body 32 and the bolt 166.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A hanging holder comprising:
   a holder body forming a central portion thereof with a vertical through-hole and including a tapered section of which the inner diameter is upwardly gradually decreased;
   a slide lock sleeve formed at the central portion thereof with a vertical through-hole and including a sleeve body slidably arranged in said holder body and a projection section mounted on the upper end of said sleeve body so as to upwardly project from said holder body;
   said sleeve body including a tapered section of which the outer diameter is upwardly gradually decreased so as to correspond to said tapered section of said holder body;
   said slide lock sleeve being provided with a chuck mechanism for selectively clamping a wire inserted through said vertical through-hole of said slide lock sleeve to hold said hanging holder with respect to the wire;
   said slide lock sleeve being constantly upwardly urged by a spring means;
   said projection section of said slide lock sleeve being formed on the outer periphery thereof with a thread;
   a lock member formed at the central portion thereof with a vertical threaded through-hole via which it is threadedly fitted on said outer periphery of said projection section of said slide lock sleeve;
   a bottom cover arranged on the bottom of said holder body for closing it and formed at the central portion thereof with a vertical through-hole;
   said holder body, slide lock sleeve, bottom cover and lock member being formed with slits so as to vertically extend therethrough and laterally extend to said vertical through-holes, respectively;
   said slits of said holder body, slide lock sleeve and bottom cover being arranged in a manner to be aligned with one another and communicate with one another;
   said slit of said lock member being arranged so as not to be aligned with said slits of said holder body, slide lock sleeve and bottom cover when said lock member is threadedly fitted on said slide lock sleeve for hanging operation;
   at least one support provided on said holder body for supporting an article to be hung therethrough on said holder body.

2. A hanging holder as defined in claim 1, wherein said holder body directly supports the article thereon through said support.

3. A hanging holder as defined in claim 1, wherein said holder body indirectly supports the article thereon through said support.

4. A hanging holder as defined in claim 1, wherein said holder body is formed into a shape like a sideways cylinder;
   said support being provided on one of flat sides of said holder body.

5. A hanging holder as defined in claim 1, wherein said spring means comprises a plurality of coiled springs arranged between said slide lock sleeve and said bottom cover in a manner to be away from said slits of said slide lock sleeve and bottom cover.

6. A hanging holder as defined in claim 1 further comprising an alignment holding means for preventing said slide lock sleeve from rotating relative to said holder body to keep the alignment between said slits of said holder body and bottom cover and said slit of said slide lock sleeve.

7. A hanging holder as defined in claim 6, wherein said alignment holding means comprises an aperture formed at the lower end of said sleeve body so as to be spaced from said slit of said slide lock sleeve and a holding pin provided on said bottom cover and fitted in said aperture.

8. A hanging holder as defined in claim 7, wherein said alignment holding means is positioned opposite to said slit of said slide lock sleeve.

9. A hanging holder as defined in claim 8, wherein said spring means comprises two coiled springs arranged between said slide lock sleeve and said bottom cover in a manner to be spaced from each other and at angular intervals from said slit and aperture of said slide lock sleeve.

10. A hanging holder as defined in claim 7, wherein said spring means comprises two coiled springs fixedly arranged between said slide lock sleeve and said bottom cover in a manner to be spaced from each other and at angular intervals from said slit of said slide lock sleeve; and
    said alignment holding means comprises a means for fixedly arranging said two coiled springs.

11. A hanging holder as defined in claim 1, wherein said support is formed into a shaft-like or cylindrical shape.

12. A hanging holder as defined in claim 1, wherein said holder body is formed into a cylindrical shape; and
    said support comprises a flange mounted on the lower end of said holder body.

13. A hanging holder as defined in claim 12, wherein said flange is formed with at least one mounting hole.

14. A hanging holder as defined in claim 12, wherein said support further comprises an additional flange mounted on the lower surface of said flange;
said additional flange being provided on the lower surface thereof with a hook.

15. A hanging holder as defined in claim 14, said hook is formed at the distal end thereof with a slit extending in the longitudinal direction thereof.

16. A hanging holder as defined in claim 1, wherein said support is arranged on each of both sides of said holder body; and
said support comprises a boss mounted on said holder body and a hook securely mounted on said boss.

17. A hanging holder as defined in claim 16, wherein said hook is fittedly mounted on said boss by means of a bolt in a manner to be interposed between said holder body and said bolt.

18. A hanging structure comprising:
a holder body forming a central portion thereof with a vertical through-hole and including a tapered section of which the inner diameter is upwardly gradually decreased;
a slide lock sleeve formed at the central portion thereof with a vertical through-hole and including a sleeve body slidably arranged in said holder body and a projection section mounted on the upper end of said sleeve body so as to upwardly project from said holder body;
said sleeve body including a tapered section of which the outer diameter is upwardly gradually decreased so as to correspond to said tapered section of said holder body;
said slide lock sleeve being provided with a chuck mechanism for selectively clamping a wire inserted through said vertical through-hole of said slide lock sleeve to hold said hanging holder with respect to the wire;
said slide lock sleeve being constantly upwardly urged by a spring means;
said projection section of said slide lock sleeve being formed on the outer periphery thereof with a thread;
a lock member formed at the central portion thereof with a vertical threaded through-hole via which it is threadedly fitted on said outer periphery of said projection section of said slide lock sleeve;
a bottom cover arranged on the bottom of said holder body for closing it and formed at the central portion thereof with a vertical through-hole;
said holder body, slide lock sleeve, bottom cover and lock member being formed with slits so as to vertically extend therethrough and laterally extend to said vertical through-holes, respectively;
said slits of said holder body, slide lock sleeve and bottom cover being arranged in a manner to be aligned with one another and communicate with one another;
said slit of said lock member being arranged so as not to be aligned with said slits of said holder body, slide lock sleeve and bottom cover when said lock member is threadedly fitted on said slide lock sleeve for hanging operation;
at least one support provided on said holder body for supporting an article to be hung therethrough on said holder body;
a connection member rotatably connected to said support; and
a fastening member threadedly connected to said connection member and fastened to the article.

19. A hanging structure as defined in claim 18, wherein said connection member is internally threaded and said fastening member is externally threaded.

20. A hanging structure as defined in claim 18, wherein the rotatable connection of said connection member to said support is carried out by means of a screw.

21. A hanging structure as defined in claim 18, wherein the rotatable connection of said connection member to said support is carried out by means of a combination of a groove and a ball forcedly abutted against said groove.

22. A hanging structure as defined in claim 21, wherein said groove is provided on the outer surface of said support in a manner to extend in the circumferential direction thereof and said ball is arranged in said connection member.

23. A hanging structure as defined in claim 19, wherein said support is arranged on each of both sides of said holder body in a manner to be opposite to each other with said holder body being interposed therebetween.

24. A hanging structure comprising:
a holder body forming a central portion thereof with a vertical through-hole and including a tapered section of which the inner diameter is upwardly gradually decreased;
a slide lock sleeve formed at the central portion thereof with a vertical through-hole and including a sleeve body slidably arranged in said holder body and a projection section mounted on the upper end of said sleeve body so as to upwardly project from said holder body;
said sleeve body including a tapered section of which the outer diameter is upwardly gradually decreased so as to correspond to said tapered section of said holder body;
said slide lock sleeve being provided with a chuck mechanism for selectively clamping a wire inserted through said vertical through-hole of said slide lock sleeve to hold said hanging holder with respect to the wire;
said slide lock sleeve being constantly upwardly urged by a spring means;
said projection section of said slide lock sleeve being formed on the outer periphery thereof with a thread;
a lock member formed at the central portion thereof with a vertical threaded through-hole via which it is threadedly fitted on said outer periphery of said projection section of said slide lock sleeve;
a bottom cover arranged on the bottom of said holder body for closing it and formed at the central portion thereof with a vertical through-hole;
said holder body, slide lock sleeve, bottom cover and lock member being formed with slits so as to vertically extend therethrough and laterally extend to said vertical through-holes, respectively;
said slits of said holder body, slide lock sleeve and bottom cover being arranged in a manner to be aligned with one another and communicate with one another;
said slit of said lock member being arranged so as not to be aligned with said slits of said holder body, slide lock sleeve and bottom cover when said lock member is threadedly fitted on said slide lock sleeve for hanging operation;

at least one support provided on said holder body for supporting an article to be hung therethrough on said holder body; and an article holder mounted on said support to securely interposedly support the article between said support and said article holder.

25. A hanging structure as defined in claim 24, wherein said support is provided on each of both sides of said holder body.

26. A hanging structure comprising:

a holder body forming a central portion thereof with a vertical through-hole and including a tapered section of which the inner diameter is upwardly gradually decreased;

a slide lock sleeve formed at the central portion thereof with a vertical through-hole and including a sleeve body slidably arranged in said holder body and a projection section mounted on the upper end of said sleeve body so as to upwardly project from said holder body;

said sleeve body including a tapered section of which the outer diameter is upwardly gradually decreased so as to correspond to said tapered section of said holder body;

said slide lock sleeve being provided with a chuck mechanism for selectively clamping a wire inserted through said vertical through-hole of said slide lock sleeve to hold said hanging holder with respect to the wire;

said slide lock sleeve being constantly upwardly urged by a spring means;

said projection section of said slide lock sleeve being formed on the outer periphery thereof with a thread;

a lock member formed at the central portion thereof with a vertical threaded through-hole via which it is threadedly fitted on said outer periphery of said projection section of said slide lock sleeve;

a bottom cover arranged on the bottom of said holder body for closing it and formed at the central portion thereof with a vertical through-hole;

said holder body, slide lock sleeve, bottom cover and lock member being formed with slits so as to vertically extend therethrough and laterally extend to said vertical through-holes, respectively;

said slits of said holder body, slide lock sleeve and bottom cover being arranged in a manner to be aligned with one another and communicate with one another;

said slit of said lock member being arranged so as not to be aligned with said slits of said holder body, slide lock sleeve and bottom cover when said lock member is threadedly fitted on said slide lock sleeve for hanging operation;

at least one support provided on said holder body for supporting an article to be hung therethrough on said holder body; and a connecting and fastening member rotatably connected to said support and fastened to the article to securely hold the article therethrough on said support.

27. A hanging structure as defined in claim 26, wherein said connecting and fastening member comprises a connection section connected to said support and a fastening section fastened to the article.

28. A hanging structure as defined in claim 27, wherein said connecting and fastening member is formed into a shape like a cylinder which is a U-shape in section;

said connection section comprising a bottom portion of said U-shaped cylinder and said fastening section comprising the leg sections of said U-shape cylinder defining a holding groove therebetween.

29. A hanging structure as defined in claim 28, wherein said connecting and fastening member is connected to said support in a manner to define a gap therebetween in the axial direction thereof.

30. A hanging structure comprising:

a holder body formed into a cylindrical shape and provided at a central portion thereof with a vertical through-hole, said holder body including a tapered section of which the inner diameter is upwardly gradually decreased;

a slide lock sleeve formed at the central portion thereof with a vertical through-hole and including a sleeve body slidably arranged in said holder body and a projection section mounted on the upper end of said sleeve body so as to upwardly project from said holder body;

said sleeve body including a tapered section of which the outer diameter is upwardly gradually decreased so as to correspond to said tapered section of said holder body;

said slide lock sleeve being provided with a chuck mechanism for selectively clamping a wire inserted through said vertical through-hole of said slide lock sleeve to hold said hanging holder with respect to the wire;

said slide lock sleeve being constantly upwardly urged by a spring means;

said projection section of said slide lock sleeve being formed on the outer periphery thereof with a thread;

a lock member formed at the central portion thereof with a vertical threaded through-hole via which it is threadedly fitted on said outer periphery of said projection section of said slide lock sleeve;

a bottom cover arranged on the bottom of said holder body for closing it and formed at the central portion thereof with a vertical through-hole;

said holder body, slide lock sleeve, bottom cover and lock member being formed with slits so as to vertically extend therethrough and laterally extend to said vertical through-holes, respectively;

said slits of said holder body, slide lock sleeve and bottom cover being arranged in a manner to be aligned with one another and communicate with one another;

said slit of said lock member being arranged so as not to be aligned with said slits of said holder body, slide lock sleeve and bottom cover when said lock member is threadedly fitted on said slide lock sleeve for hanging operation;

a support comprising a flange which is provided on the lower end of said holder body for supporting an article to be hung therethrough on said holder body; and a connecting and fastening member comprising a connection section formed wi&h a vertical through-hole via which said connection section is fitted on said holder body and supported on said flange and a fastening section to which the article is fastened;

said connecting and fastening member being formed with a slit so as to laterally extend to said through-hole of said connection section and vertically extend over the vertical length thereof.

* * * * *